(12) United States Patent
Fenton (10) Patent No.: US 7,225,941 B2
(45) Date of Patent: *Jun. 5, 2007

(54) RECONDITIONED PROPANE CYLINDERS

(76) Inventor: Ronald L. Fenton, 1749 Golf Rd., Suite 300, Mt. Prospect, IL (US) 60056

( * ) Notice: Subject to any disclaimer, the term of this patent is extended or adjusted under 35 U.S.C. 154(b) by 581 days.

This patent is subject to a terminal disclaimer.

(21) Appl. No.: 10/794,596

(22) Filed: Mar. 5, 2004

(65) Prior Publication Data

US 2004/0188435 A1 Sep. 30, 2004

Related U.S. Application Data

(63) Continuation-in-part of application No. 09/867,365, filed on May 29, 2001, now Pat. No. 6,751,835, which is a continuation-in-part of application No. 09/689,919, filed on Oct. 13, 2000, now Pat. No. 6,604,644, which is a continuation-in-part of application No. 09/318,277, filed on May 25, 1999, now abandoned.

(51) Int. Cl.
*F17C 1/04* (2006.01)
(52) U.S. Cl. .................................................. 220/88.1
(58) Field of Classification Search .................... None
See application file for complete search history.

(56) References Cited

U.S. PATENT DOCUMENTS

| | | | | |
|---|---|---|---|---|
| 2,685,979 A * | 8/1954 | Zeek et al. | ................. | 220/588 |
| 3,356,256 A * | 12/1967 | Szego | ........................ | 220/88.1 |
| 4,887,579 A * | 12/1989 | Fenton et al. | ............... | 123/525 |
| 4,964,930 A * | 10/1990 | Conn | .......................... | 156/85 |
| 5,000,336 A * | 3/1991 | Gass | ........................ | 220/88.1 |
| 5,822,838 A * | 10/1998 | Seal et al. | ................. | 29/469.5 |
| 6,314,947 B1* | 11/2001 | Roche | ........................ | 123/525 |
| 6,415,942 B1* | 7/2002 | Fenton et al. | ............... | 220/563 |
| 6,604,644 B1* | 8/2003 | Fenton | ...................... | 220/88.1 |
| 6,751,835 B2* | 6/2004 | Fenton | ...................... | 29/401.1 |

* cited by examiner

*Primary Examiner*—Stephen J. Castellano
(74) *Attorney, Agent, or Firm*—Douglas B. White (57) ABSTRACT

A reconditioned used propane gas tank or cylinder having (1) aluminum mesh inserts formed from a sheet of aluminum mesh and positioned into the propane cylinder/tank to provide a large wetted surface area inside the tank for increasing the efficiency of vaporization, (2) a replaced relief valve with a higher CFM rating, (3) a coating of a corrosive resistant adhesive material on the outer surface of the cylinder, and (4) a sheath of fire resistant composite fiber affixed to the outer surface of the cylinder.

11 Claims, 8 Drawing Sheets

FIG. 1

PRIOR ART

RECONDITIONED PROPANE CYLINDERS

CROSS REFERENCE TO RELATED APPLICATIONS

This application is a Continuation-In-Part of U.S. application Ser. No. 09/867,365, filed May 29, 2001, now U.S. Pat. No. 6,751,835, which is a Continuation-In-Part of U.S. application Ser. No. 09/689,919 filed Oct. 13, 2000, now U.S. Pat. No. 6,604,644, which is a Continuation-In-Part of U.S. application Ser. No. 09/318,277, filed May 25, 1999 now abandoned.

STATEMENT REGARDING FEDERALLY SPONSORED RESEARCH OR DEVELOPMENT

Not Applicable

BACKGROUND OF THE INVENTION

1. Field of the Invention

The present invention relates to reconditioned, retrofitted or upgraded used propane gas cylinders from a standard unprotected plain cylinder to a substantially explosion resistant cylinder that is safer in all threat situations. Generally, the present invention relates to fuel tanks used for flammable or explosive fluids such as gasoline, diesel fuel, butane and LP-Gas; and, more particularly, to upgrading used tanks or cylinders by (a) employing rolled aluminum inserts to fill substantially the cylindrical interior with minimal flaking of the aluminum inserts, and providing with such inserts additional internal wetted surface areas within the tank to increase the efficiency discharge rate of explosive vapors in the tank, (b) changing a relief valve for the tank to a higher CFM (cubic feet per minute) discharge rate thereby to eliminate heated vapors faster, (c) applying a coating to the outside of the cylinder of calcium carbonate/calcium sulfonate complex and (d) adding an outer sheet, sheath, sleeve or wrapper of composite fiber fire resistant material having projections or bumps on its outer periphery around the tank and in this way address the problem that occurs with aluminum tanks which tend to lose structural integrity when exposed to high heat.

2. Description of the Prior Art

There are millions of used LP-Gas cylinders, both steel and aluminum, that are in use today in the United States. They do not have any type of internal protection from explosions other than a relief valve to relieve vapor over-pressures when they are exposed to fires, punctures, ballistics and other such threats. These aluminum cylinders are getting old and can possibly be a major explosion hazard within the next few years. However, if they can be upgraded and re-certified without any major changes, then the metal of the tank or cylinder may be able to withstand over-pressures caused by faulty relief valves. Many people are injured or killed because of malfunctioning clogged, stuck and/or faulty relief valves. In a typical LP-Gas application there is generally provided a metallic tank wall designed to contain the fuel under pressure. This tank is typically of steel or aluminum composition for portable applications (motor fuel, portable LP-Gas applications) and further includes associated valves and connections at one end for gaining access to the contents of the tank or cylinder. There is also a pressure relief valve at the same end as the access connection. When the tank is in a heated environment, such as a fire, the fluid or liquid proximate a hot spot on the wall of the tank will boil and eventually ignite, with a resulting explosion. Prior attempts to neutralize the explosion tendencies of the tank have included providing at the initial point of manufacture of the tank, an expanded aluminum foil mesh as a filler mass insert. Such a system is described in Canadian Patent No. 736,802. The container is filled with the mesh, which divides the container into many small cell-like compartments, and through the mesh the fuel transfers the heat away from the "hot spot" to delay the local rise in temperature and a deadly explosion.

Improvements in tank design have recently been directed to preventing nesting of the mesh insert by reversing alternate layers in a roll. This is done when the tank is newly manufactured. Nesting occurs where the mesh pattern of adjacent layers settle against each other in a mating relationship.

A recent anti-nesting system is described in U.S. Pat. No. 4,149,649. Even with the anti-nesting pattern of the prior art, the lightweight foil in the mesh tends to collapse and compress and its effectiveness diminished during use; this is particularly true for transportable containers, motor fuel containers and vehicular fuel tanks.

Recently a new technique was developed for heat transfer from aluminum mesh inserts to the wall of a fuel tank, which is described in U.S. Pat. No. 4,673,098 issued to Fenton et al., and which dramatically improved the thermal conductivity to the tank wall and which reduced the compression effect.

In the vehicle and lift truck tank industry, where weight is of a high importance, tanks of aluminum composition are extremely popular and have been in service for over 20 years.

Unfortunately, the aluminum tank wall tends to melt at a lower temperature than steel tanks such that its structural integrity is quickly lost in a fire. Adding to this is the fact that existing relief valves are often clogged and dirty and will not always open as designed which causes the wall to fail sooner than its designed fail point, causing catastrophic explosions.

Attempts to insulate or coat the outer surface of such tanks have proved unsatisfactory inasmuch as the coating does not remain sufficiently intact to produce consistent reliable results.

SUMMARY OF THE INVENTION

According to the present invention, the old relief valve is first removed from the cylinder and aluminum foil inserts are pushed into the cylinder until they are fully packed to the top of the valve opening. The inserts provide the additional wetted surface area required to initiate additional efficient vaporization within the tank. The aluminum filler mass inserts are impervious to propane and take up less than 3% of the liquid volume of the tank. Aluminum foil filler masses in large sheet form have been used in propane cylinders since 1991 without a single incident of injury or death, although they were exposed to fires and other types of threats.

It is a further feature of the invention, when the cylinder is reconditioned, to provide a new relief valve rated at a higher CFM discharge rate than is presently being installed on newly manufactured aluminum cylinders. This new higher CFM rated valve will allow a greater rate of discharge from the pressurized overheated tank.

Propane vapor is more readily created by the added aluminum foil filler mass inserts. These filler mass inserts provide additional wetted surface area within the tank and create more efficient vaporization rates when heat is being applied to the container. This will reduce the chance of the tank wall failing in the used container that has been subjected to heat and will allow more time for persons to evacuate the immediate area.

Another feature of the present invention is to install a fiber/resin composite outer wrapper on the tank that slips over the outer wall of the tank. This will provide a fire resistant shield to reduce any heat applied to the outer wall and will further strengthen the outer wall of the cylinder. This wrapper is molded to fit the outer wall of the container and it will snap into place when it is installed over the top of the cylinder. The wrapper has raised ribs and/or bumps to help keep the wall of the cylinder free from dents and scratches. If desired, the wrapper may be glued to the outer wall of the cylinder with a fire resistant adhesive (e.g., 3M EC776).

Finally, the added wetted surface of the internal filler mass established by the aluminum inserts provides additional pressure for opening the relief valve when the cylinder is exposed to heat. This will help unclog and open the relief valve which has been subjected to dirt and other contaminants that would otherwise cause the relief valve to become stuck and malfunction. Since a clogged relief valve will not normally open fully, the added pressure from the added wetted surface within the tank will help to unclog the relief valve, thus relieving the over-pressure within the tank and thereby avoiding an explosion.

DESCRIPTION OF THE PREFERRED EMBODIMENT

Figure 1:
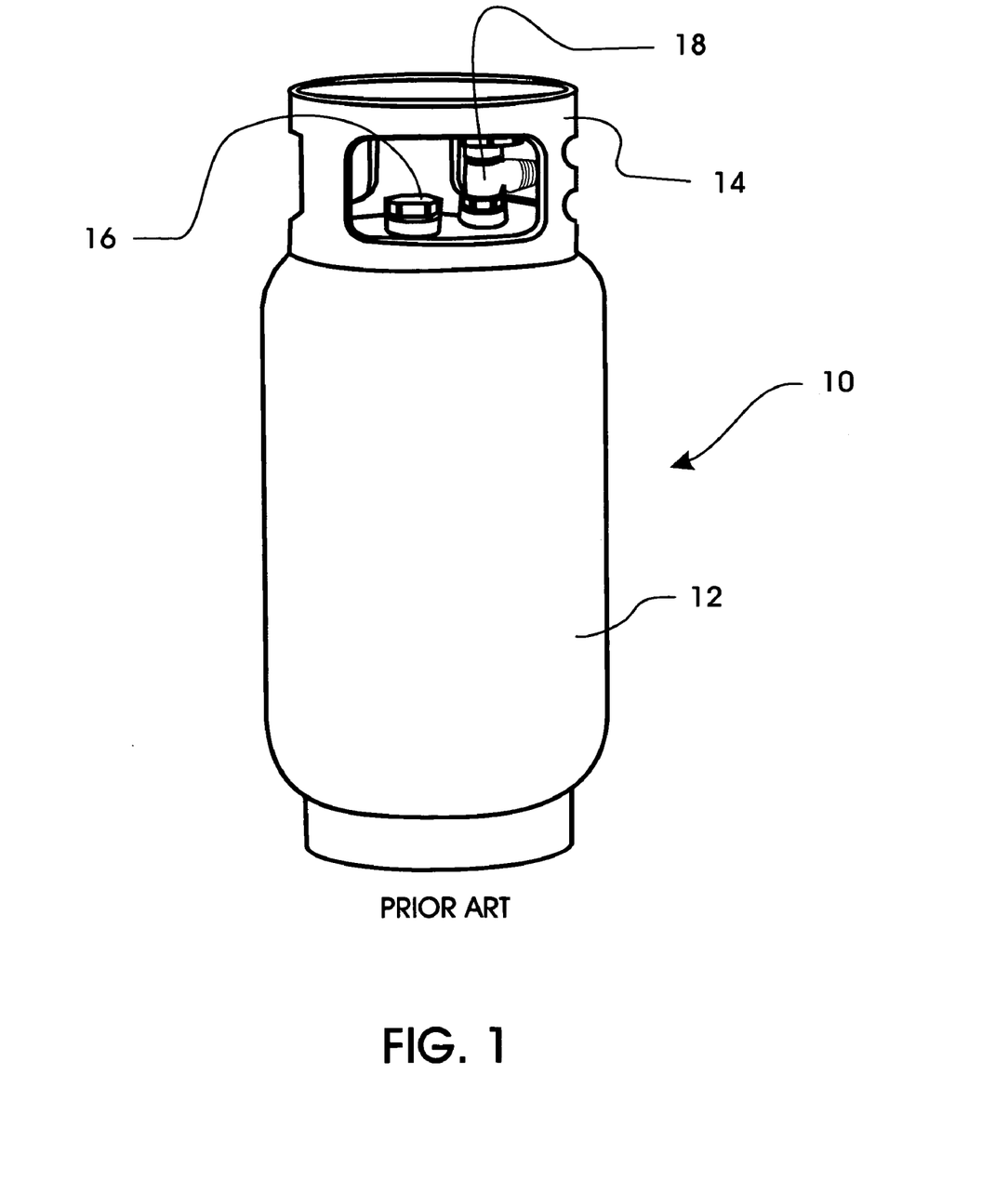
FIG. 1 is a front perspective view of a prior art used propane tank/cylinder.

Referring now to the drawings in greater detail, there is illustrated in FIG. 1 a prior art propane tank or cylinder 10 which has an aluminum cylindrical body 12, an upper protective collar 14, a relief valve 16 and an input/output fixture 18.

Figure 2:
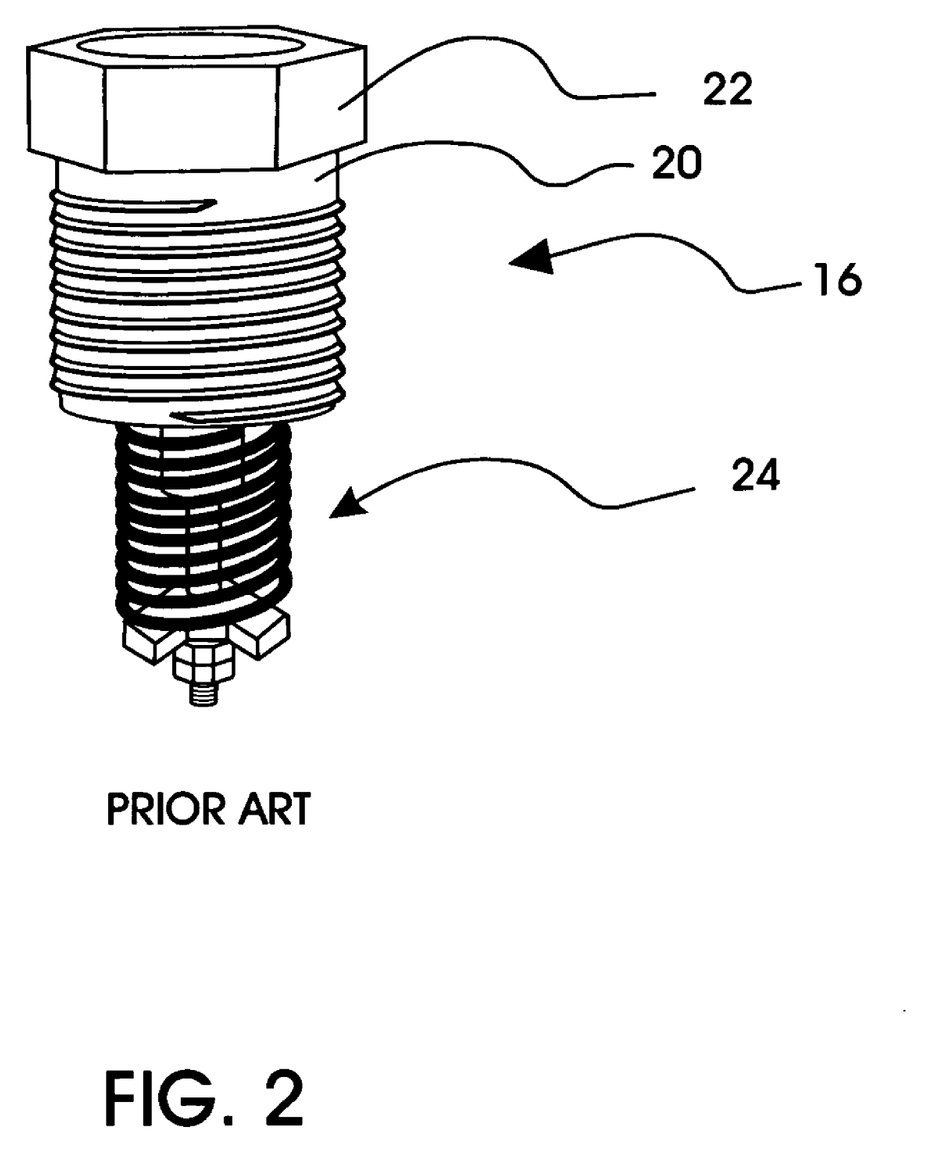
FIG. 2 is a perspective view of a prior art relief valve.

As shown in FIG. 2, the relief valve 16 includes a threaded cylindrical body 20, a hexagonal head 22 and a spring biased valve mechanism 24.

Such a prior art propane tank or cylinder 10, when subjected to fire and heat, can explode and cause damage to property and injury or death to people in the area.

An object of the present invention is to delay such an explosion of a propane tank or cylinder to allow people in the area of a fire where a propane tank assembly is located to have sufficient time to vacate the area and to inhibit, if not prevent, explosion of the tank.

According to the teachings of the present invention, this is achieved by (1) removing the old relief valve 16, (2) inserting specially formed aluminum mesh inserts 26 into the tank 10, (3) replacing the relief valve with a new relief valve having a higher CFM rate than is now standard in the lift truck propane gas tank industry, (4) coating the tank with a corrosion and fire resistant adhesive material having a high softening or dropping point temperature, such as a calcium carbonate/calcium sulfonate complex material, and (5) placing a sleeve, sheath, shield or wrapper made of fire resistant composite fiber material, composed of natural and or synthetic fibers and thermoplastic materials, and having bumps, projections or ribs on the outer peripheral surface thereof to provide further protection to the wall of the propane cylinder.

Figure 3A:
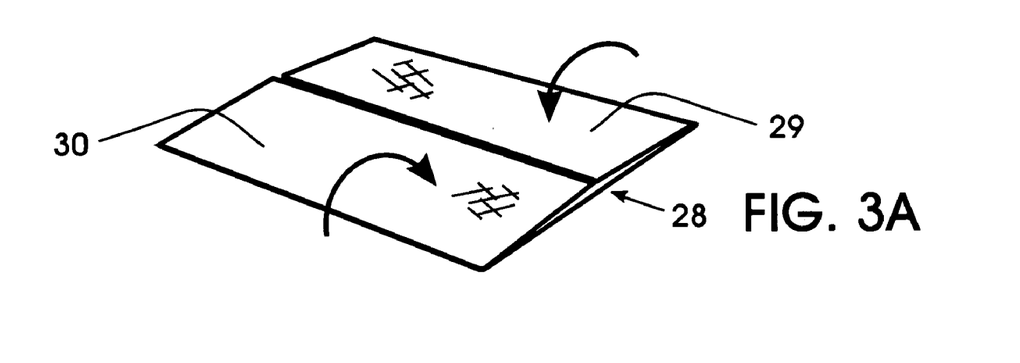
FIG. 3A is a perspective view of a folded sheet of mesh aluminum.
Figure 3B:
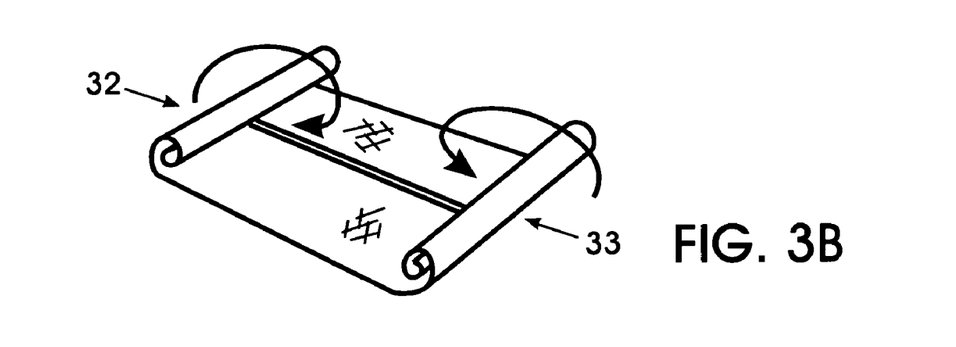
FIG. 3B is a perspective view of the folded sheet shown in FIG. 3A as it is being rolled up from opposite sides.

The inserts for the cylinder are formed from a sheet of aluminum mesh, as shown in FIGS. 3A–3B. Referring now to FIG. 3A, there is illustrated therein a sheet 28 of aluminum mesh material with two side portions 29 and 30 folded over. Then, as shown in FIG. 3B, transverse to the two side portions 29 and 30, ends of the folded sheet 28 are rolled toward each other.

Figure 3C:
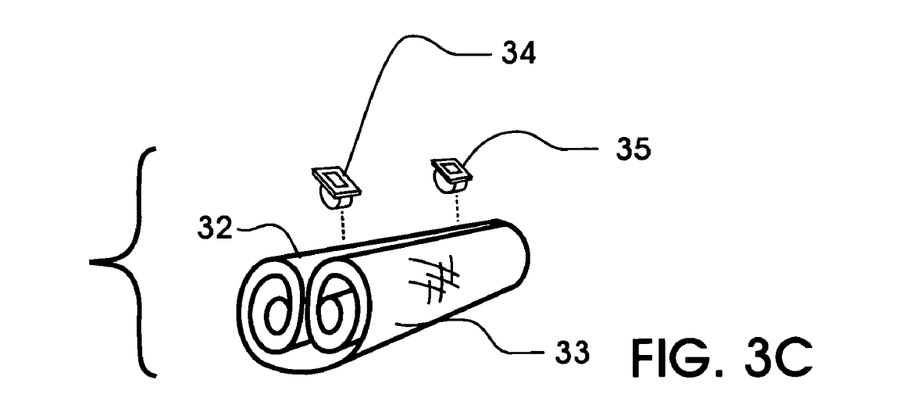
FIG. 3C is a perspective view of the rolled up folded sheet with two clips juxtaposed to the rolled up folded sheet.

Next, as shown in FIG. 3C, the rolled portions 32 and 33 are secured together with two clips 34 and 35 to form an aluminum mesh insert 26.

Figure 4:
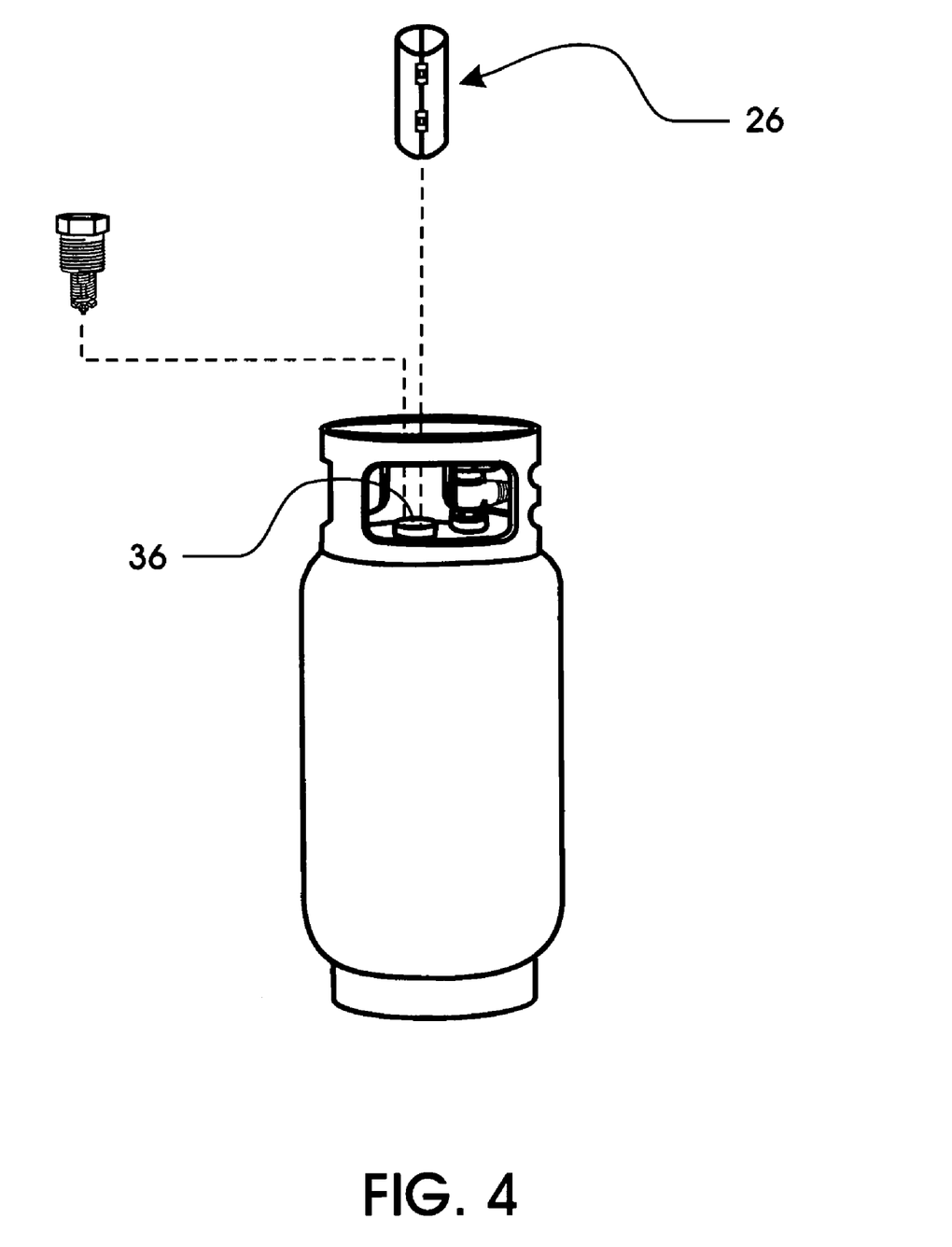
FIG. 4 is a perspective view of the propane tank/cylinder shown in FIG. 1 with the old relief valve removed and with a clipped rolled up folded sheet or mesh insert positioned for insertion through the relief valve opening.

As shown in FIG. 4, a plurality of mesh inserts 26 are then inserted through an opening 36, for mounting the relief valve 16, and into the interior 38 (see FIG. 5) of the body 12 of the tank 10.

Figure 5:
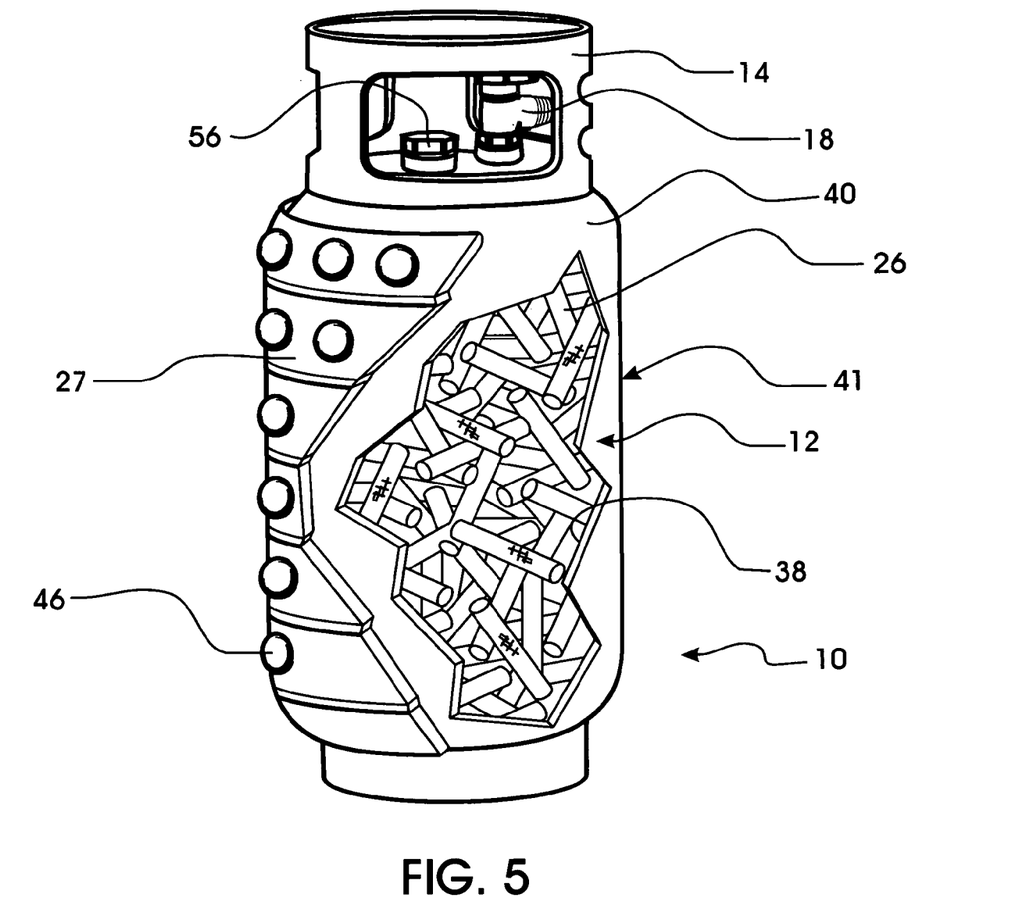
FIG. 5 is a perspective view with portions broken away of a retrofitted propane tank/cylinder with a new, larger relief valve installed, with the interior packed with clipped rolled up folded sheets or mesh inserts, with a coating of calcium carbonate/calcium sulfonate complex adhesive material on the exterior of the tank and with a wrapper or sheath of composite fiber fire resistant material having exterior bumps.

FIG. 5 shows a plurality of mesh inserts 26 which have been inserted into the tank 10 to substantially fill the interior 38 of the body 12 of the tank 10.

Then, the outer peripheral surface 40 of the body 12 is cleaned and a coating 41 of a calcium carbonate/calcium sulfonate complex (inorganic/organic complex) adhesive material is placed on the outer peripheral surface 40 of the body 12 of the tank 10. Such a coating can be a compound sold under the trademark ARMOR-SHIELD by Watson Coatings, Inc., of Ferguson, Mo.

Then, after the coating 41 has been applied to the outer surface 40 of the body 12 of the propane cylinder or tank 10, a sleeve, sheath or wrapper 27 of fire resistant composite fiber material having projections, bumps or ribs 46 on an outer periphery thereof is fixed around the tank body 12 to provide further protection to the wall of the propane tank 10.

Figure 6:
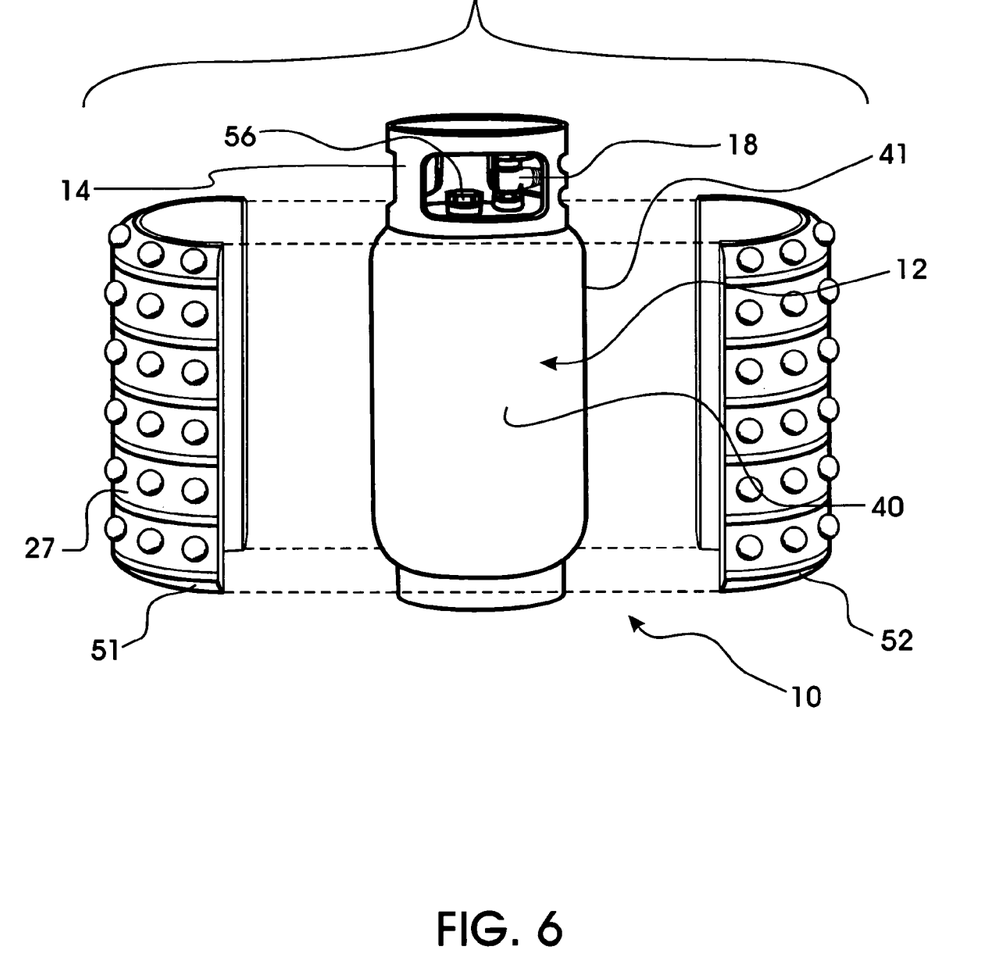
FIG. 6 is a perspective view of the tank/cylinder with the wrapper or sheath of composite fiber fire resistant material cut in half and separated from the tank or cylinder.
Figure 7:
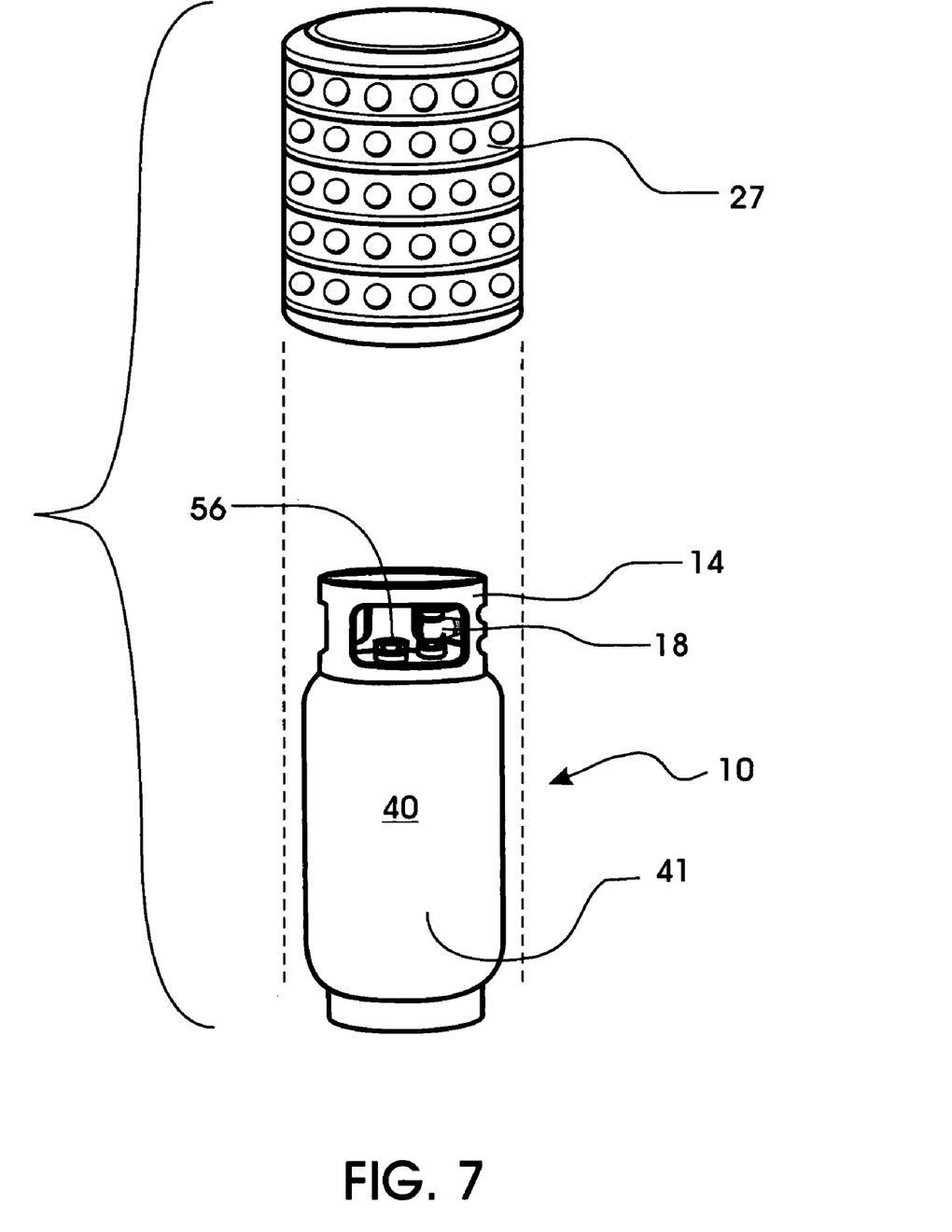
FIG. 7 is a perspective view of the cylindrical sheath or wrapper positioned above the reconditioned tank/cylinder.

As shown in FIG. 6, the sheath can be formed in two sections 51 and 52 and then placed around the tank 10. Alternatively, and as shown in FIG. 7, the sleeve, sheath or wrapper can be formed as a single piece and slipped over the outer peripheral surface 40 of the tank body 12.

Finally, a new relief valve 56, having a higher CFM rate than is now standard in the lift truck propane gas tank industry for newly manufactured propane cylinders, is mounted in the opening 36 in the top of the tank body 12 to provide a retrofitted, reconditioned propane tank or cylinder 60 which is highly resistant to explosion.

In this respect, the aluminum mesh inserts 26 provide added wetted surface areas to facilitate vaporization and provide additional heat transfer material. Then, the new pressure relief valve 56 allows gas to escape faster from the tank when it is heated. Finally, the coating 41 and the sleeve 27 slow the heating of the cylinder and melting of the cylinder from the high heat of a fire.

Additionally, the aluminum tank body is subject to pitting and electrolysis from the ambient weather conditions and the coating 41 of calcium carbonate/calcium sulfonate complex protects the tank body from the ambient weather conditions. The sleeve 27 provides added protection against heat and provides additional physical protection to the tank with the bumps or ribs 46 which allow the tank to be bounced around without incurring damage to the tank body 12.

Figure 8:
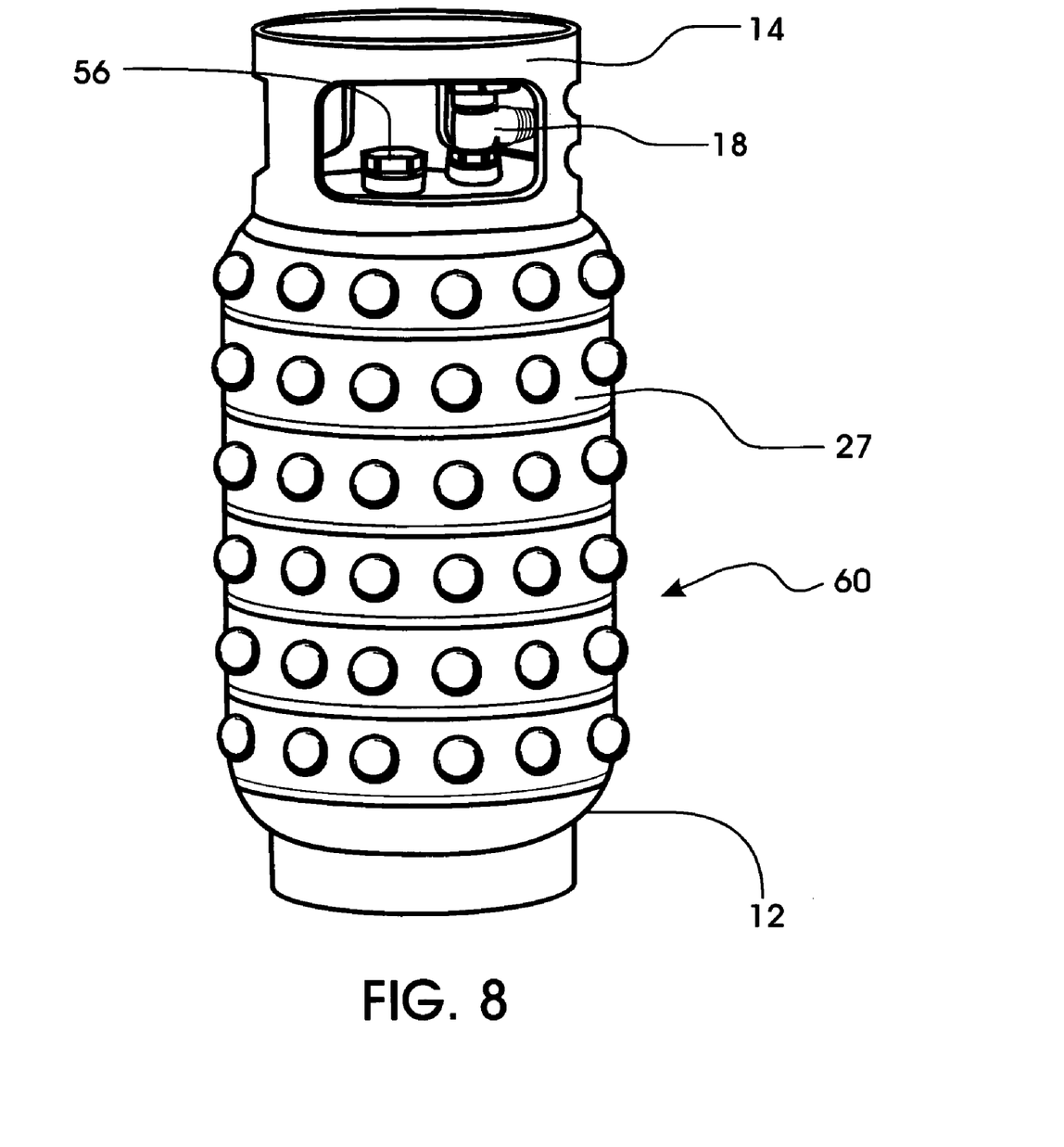
FIG. 8 is a perspective view of a completely reconditioned propane tank/cylinder.

In this way, the retrofitted and reconditioned propane cylinder tank 60 shown in FIG. 8 provides an increased margin of safety in the event of a fire in an area where the tank 60 is located.

It will be understood that modifications can be made to the reconditioned cylinder 60 of the present invention without departing from the teachings of the invention. Accordingly, the scope of the invention is only to be limited as necessitated by the accompanying claims.

What is claimed is:

1. A reconditioned propane cylinder comprising:
   a used propane cylinder;
   mesh inserts positioned inside the cylinder formed from sheets of aluminum mesh material, whereby said aluminum mesh inserts provide a large wetted surface area inside the tank for increasing the efficiency of vaporization, wherein side portions of said sheet of aluminum mesh material are first folded over a middle portion, followed by rolling opposite ends of said folded sheet, transverse to said side portions, toward each other; and
   a new relief valve mounted on the propane cylinder.

2. The reconditioned propane cylinder of claim 1 further comprising a coating of a corrosive resistant and thermally stable adhesive material on the outer surface of the propane cylinder.

3. The reconditioned propane cylinder of claim 2 wherein said coating is a calcium carbonate/calcium sulfonate complex.

4. The reconditioned propane cylinder of claim 3 further comprising a sleeve, sheath or wrapper of fire resistant material mounted on an outer peripheral surface of the propane cylinder.

5. The reconditioned propane cylinder of claim 4 wherein said sheet, sheath or wrapper is made of fire resistant composite fiber material.

6. The reconditioned propane cylinder of claim 5 wherein said sheet, sheath or wrapper has projections, bumps or ribs on the outer peripheral surface thereof to provide further protection to the wall of the propane cylinder.

7. The reconditioned propane cylinder of claim 1 further comprising clips for securing said mesh inserts.

8. The reconditioned propane cylinder of claim 7 further comprising a coating of a corrosive resistant and thermally stable adhesive material on the outer surface of the cylinder.

9. The reconditioned propane cylinder of claim 8 further comprising a sleeve, sheath or wrapper of fire resistant material mounted on an outer peripheral surface of the propane cylinder.

10. The reconditioned propane cylinder of claim 9 wherein said coating is a calcium carbonate/calcium sulfonate complex.

11. The reconditioned propane cylinder of claim 10 wherein said sheet, sheath or wrapper is made of fire resistant composite fiber material.

* * * * *